United States Patent
Takada et al.

(10) Patent No.: US 8,805,997 B2
(45) Date of Patent: Aug. 12, 2014

(54) COMMUNICATION APPARATUS DETECTING ABNORMAILITY BY COMMUNICATING AN EFFECTIVENESS NOTIFICATION

(75) Inventors: Hiroaki Takada, Nagoya (JP); Ryo Kurachi, Nagoya (JP); Yukihiro Miyashita, Yokkaichi (JP)

(73) Assignees: National University Corporation Nagoya University, Nagoya-Shi (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 301 days.

(21) Appl. No.: 12/734,167

(22) PCT Filed: Oct. 13, 2009

(86) PCT No.: PCT/JP2009/005323
§ 371 (c)(1),
(2), (4) Date: Apr. 15, 2010

(87) PCT Pub. No.: WO2010/044248
PCT Pub. Date: Apr. 22, 2010

(65) Prior Publication Data
US 2010/0211676 A1    Aug. 19, 2010

(30) Foreign Application Priority Data
Oct. 15, 2008  (JP) ................................ 2008-266695

(51) Int. Cl.
G06F 15/173      (2006.01)
G06F 11/00       (2006.01)

(52) U.S. Cl.
USPC .......................................... 709/224; 370/221

(58) Field of Classification Search
USPC .................................. 709/224; 370/216–228
See application file for complete search history.

(56) References Cited

U.S. PATENT DOCUMENTS

| 2003/0152027 A1* | 8/2003  | Takagi ........................... 370/222 |
| 2003/0189955 A1* | 10/2003 | Iraschko et al. ............... 370/532 |
| 2006/0164999 A1* | 7/2006  | Yamamoto et al. ........... 370/241 |
| 2009/0052317 A1* | 2/2009  | Takagi et al. .................. 370/223 |
| 2010/0034090 A1* | 2/2010  | Bader et al. .................... 370/236 |

FOREIGN PATENT DOCUMENTS

| JP | A-60-037851    | 2/1985  |
| JP | A-07-264233    | 10/1995 |
| JP | A-10-320323    | 12/1998 |
| JP | A-2003-324463  | 11/2003 |
| JP | A-2007-251290  | 9/2007  |
| JP | A-2008-022158  | 1/2008  |
| WO | WO 2006104285 A1 * | 10/2006 |
| WO | WO 2008055534 A1 * | 5/2008  |

OTHER PUBLICATIONS

International Search Report issued in International Application No. PCT/JP2009/005323 on Nov. 10, 2009.

* cited by examiner

Primary Examiner — Jeong S Park
(74) Attorney, Agent, or Firm — Oliff PLC (57) ABSTRACT

When communication is performed with the upstream and downstream sides being defined in the order of relay apparatuses, the relay apparatuses each transmit a keepalive message representing that they are effectively performing communication. When no keepalive message can be received from the relay apparatus and an abnormality is detected thereby, the relay apparatus transmits a keepalive message including abnormality information representing that the abnormality is detected. By receiving the keepalive message including the abnormality information, the relay apparatus detects the abnormality on the upstream side, changes a communication path, and transmits a master candidate notification to the relay apparatus on the downstream side in order that the relay apparatus itself becomes a master.

7 Claims, 9 Drawing Sheets

COMMUNICATION APPARATUS DETECTING ABNORMAILITY BY COMMUNICATING AN EFFECTIVENESS NOTIFICATION

This application is the national phase under 35 U.S.C. 371 of PCT International Application No. PCT/JP2009/005323 which has an International filing date of Oct. 13, 2009 and designated the United States of America.

BACKGROUND

1. Technical Field

The present invention relates to a communication system in which data is transmitted and received between a plurality of communication apparatuses. In particular, the present invention relates to a communication apparatus, a communication system and a communication method in which when a trouble occurs in a communication between communication apparatuses connected in series in a topology such as the ring topology or the daisy-chain topology, the function as a communication system can be automatically restored by the processing by each communication apparatus.

2. Description of Related Art

In recent years, in various fields, a system has been used in which a plurality of apparatuses are connected, a function is assigned to each apparatus and the apparatuses exchange data with each other and perform various processings in cooperation. For example, in the field of the vehicle-mounted LAN (local area network) disposed on vehicles, ECUs (electronic control units) each perform a processing specific thereto and are connected by a communication line to exchange data with each other, whereby various functions are implemented as a system.

With the specialization of the function of each apparatus and the increase in the number of functions that each apparatus can perform, the number and type of apparatuses connected to the communication line increases. Further, since various functions are expected as a system, it becomes necessary that the apparatuses share data and cooperate, so that the amount of transmitted data increases.

The increase in the amount of data transmitted and received by a communication line leads to a delay or loss of data due to a collision. A significant delay or loss of data is sometimes fatal to the driving assistance function such as brake control by the ECUs.

Therefore, a structure is typical in which the communication line is divided into a plurality of lines and the ECUs are connected to different lines, respectively. This is because wasteful use of the communication line can be suppressed by grouping ECUs that share data. In the field of the vehicle-mounted LAN, since the weight reduction of the system is particularly desired, a structure in which the number of communication lines is also small is desired. Since the communication lines are efficiently used to cope with the increase in the kind of ECUs, a structure is present in which ECUs are separately connected to communication lines of different communication speeds according to the kind of transmitted and received data. In these structures, the different communication lines are connected by relay apparatuses that control the transmission and reception of data.

Even when the ECUs are divided into a plurality of groups, the amount of data sent out to the communication lines cannot be reduced in a structure in which data necessary for controlling the ECUs are all transferred by the relay apparatuses. Accordingly, Japanese Patent Application Laid-Open No. 2008-22158 discloses a technology in which the data received from the ECUs is temporarily stored in a database and the ECUs read necessary data from the database as required and transmit it.

SUMMARY

In the communication system as disclosed in Patent Application Laid-Open No. 2008-22158, since data is transmitted and received at high speed between the relay apparatuses and the sameness and simultaneity of the data stored in the relay apparatuses are maintained, there are cases where the topology between the relay apparatuses is the ring topology or the daisy-chain topology.

In this case, when a trouble occurs with the connection between any of the relay apparatuses, the function stops as the entire system. A similar problem can occur not only in communications between relay apparatuses in the communication system of the vehicle-mounted LAN as disclosed in Japanese Patent Application Laid-Open No. 2008-22158 but also in the communication system including a plurality of communication apparatuses connected in series in a topology such as the ring topology or the daisy-chain topology.

Accordingly, a method is considered in which each communication apparatus continues to periodically transmit a keepalive message representing that the communication apparatus itself is effectively performing communication, each communication apparatus detects that an abnormality occurs in the communication with an other communication apparatus when a keepalive message cannot be received from the other communication apparatus, and the other communication apparatus is separated from the system when an abnormality occurs, thereby avoiding the entire system stopping.

In this case, when one communication apparatus becomes unable to perform transmission or reception, a communication apparatus adjacent to the one communication apparatus detects the abnormality and separates the one communication apparatus, whereby the system operation can be continued. However, when a trouble occurs only with some of the transmission ports of one communication apparatus and reception can be executed continuously, only the communication apparatuses connected to the transmission ports where the trouble occurs detect the abnormality and the communication apparatuses connected to the other transmission ports do not detect the abnormality. The one communication apparatus itself having the transmission ports where the trouble occurs do not detect the abnormality since it continuously receives a keepalive message from the other communication apparatuses. Therefore, with the structure in which abnormality is detected based on only whether a keepalive message is received or not, the system cannot completely recover from the trouble.

The present invention is made in view of such circumstances, and an object thereof is to provide a communication apparatus, a communication system and a communication method in which by transmitting information representing that an abnormality is detected together with information (keepalive message) representing that the communication apparatus is effectively performing communication, for example, by adding the abnormality detection information to the keep alive message, when a trouble occurs in a communication between communication apparatuses connected in series, the function as a communication system can be automatically restored by the processing by each communication apparatus.

A communication apparatus according to a first aspect of the invention is a communication apparatus in which communication means for transmitting and receiving data to and from an other communication apparatus is provided, means for transmitting an effectiveness notification representing that communication is effective to the other communication apparatus by the communication means and means for receiving the effectiveness notification from the other communication apparatus are provided, and an abnormality in a communication with the other communication apparatus is detected based on whether the effectiveness notification is received from the other communication apparatus or not. The communication apparatus is provided with: means for transmitting abnormality information representing that the abnormality is detected to the other communication apparatus together with the effectiveness notification when the abnormality in the communication with the other communication apparatus is detected; means for stopping part or all of the communication with the other communication apparatus when the abnormality in the communication with the other communication apparatus is detected by not having received the effectiveness notification from the other communication apparatus or by having received the abnormality information from the other communication apparatus; and change information transmitting means for transmitting information for changing a communication path with the other communication apparatus when the abnormality in the communication with the other communication apparatus is detected.

In a communication apparatus according to a second aspect of the invention, the communication means has a plurality of connection means defined as either upstream or downstream on the communication path and separately transmits and receives data to and from the other communication apparatus, and when an abnormality in a communication with a communication apparatus on the upstream side is detected or when the abnormality information received together with the effectiveness notification through the connection means on the upstream side represents that an abnormality is detected, the change information transmitting means transmits a candidate notification to the other communication apparatus through the connection means on the downstream side in order that its own communication apparatus becomes a specific communication apparatus serving as a starting point on the communication path.

In a communication apparatus according to a third aspect of the invention, when an abnormality in a communication with the communication apparatus on the downstream side is detected or when the abnormality information received together with the effectiveness notification through the connection means on the downstream side represents that an abnormality is detected, the change information transmitting means transmits a response to the candidate notification to the other communication apparatus through the connection means on the upstream side in order that its own communication apparatus becomes a termination point on the communication path.

A communication apparatus according to a fourth aspect of the invention is further provided with means for transmitting information representative of a communication condition together with the effectiveness notification by the communication means.

A communication system according to a fifth aspect of the invention is a communication system in which a plurality of communication apparatuses having communication means for transmitting and receiving data are connected in a ring topology or in a daisy-chain topology through a communication line, data is transmitted and received between the plurality of communication apparatuses with one of the plurality of communication apparatuses as a starting point, the plurality of communication means each have means for transmitting an effectiveness notification representing that communication is effective to an other communication apparatus by the communication means and means for receiving the effectiveness notification from the other communication apparatus, and an abnormality in a communication with the other communication apparatus is detected based on whether the effectiveness notification is received from the other communication apparatus or not. The communication apparatuses are each provided with: means for transmitting abnormality information representing that the abnormality is detected to the other communication apparatus together with the effectiveness notification when the abnormality in the communication with the other communication is detected; and change information transmitting means for transmitting information for changing a communication path with the other communication apparatus when the abnormality in the communication with the other communication apparatus is detected by not having received the effectiveness notification from the other communication apparatus or by having received the abnormality information from the other communication apparatus, and when an abnormality is detected in any of the communications between the communication apparatuses, the communication apparatus serving as the starting point and the communication path are redetermined.

A communication method according to a sixth aspect of the invention is a communication method in which in a communication system in which a plurality of communication apparatuses having communication means for transmitting and receiving data are connected in a ring topology or in a daisy-chain topology through a communication line and data is transmitted and received between the plurality of communication apparatuses with one of the plurality of communication apparatuses as a starting point, the plurality of communication apparatuses each transmit an effectiveness notification representing that communication is effective to an other communication apparatus by the communication means, receive the effectiveness notification from the other communication apparatus, and detect an abnormality in a communication with the other communication apparatus based on whether the effectiveness notification is received from the other communication apparatus or not. When the abnormality in the communication with the other communication apparatus is detected, the communication apparatuses each transmit abnormality information representing that the abnormality is detected to the other communication apparatus together with the effectiveness notification, when the abnormality in the communication with the other communication apparatus is detected by not having received the effectiveness notification from the other communication apparatus or by having received the abnormality information from the other communication apparatus, the communication apparatuses each stop part or all of the communication with the other communication apparatus, and when the abnormality in the communication with the other communication apparatus is detected, the communication apparatuses each transmit information for changing a communication path with the other communication apparatus.

According to the first, fifth and sixth aspects of the invention, when an effectiveness notification that should be transmitted from an other communication apparatus cannot be received and thereby, a communication apparatus detects an abnormality in a communication with the other communication apparatus, the communication apparatus transmits abnormality information representing that the abnormality is detected to the other communication apparatus together with the effectiveness notification representing that its own communication is effective. Thereby, in cases such as when a trouble occurs with part of its own communication means, the communication apparatus can detect it by the abnormality information transmitted from the other communication apparatus together with the effectiveness notification. For example, when a trouble occurs with its own transmission means, since the effectiveness notification is not transmitted to the other communication apparatus, the abnormality is detected by the other communication apparatus, the abnormality information is transmitted from the other communication apparatus, and by receiving this, the communication apparatus can detect the abnormality. Or when a trouble occurs with its own reception means, since the effectiveness notification from the other communication apparatus cannot be received, the communication apparatus can detect the abnormality, and since the abnormality information together with the effectiveness notification is transmitted to the other communication apparatus to which the reception means is connected, the other communication apparatus to which the reception means is connected can also detect the abnormality.

Further, when an abnormality is detected, the communication apparatus stops part or all of the communication with the other communication apparatus on the side where the abnormality is detected, and with this, transmits change information to the other communication apparatus in order to change a communication path with the other communication apparatus. Thereby, the communication between the communication apparatuses where the abnormality is detected is partly or wholly stopped, influence on the entire communication system is avoided, and information for changing the communication path is shared by the other communication apparatus, so that the communication apparatuses can operate so as to redetermine the communication path excluding the path between the communication apparatuses the communication between which is partly or wholly stopped.

According to the second aspect of the invention, the communication apparatuses connected in series each have a plurality of connection means so as to separately transmit and receive data to and from the other communication apparatus, the communication means to which the communication apparatuses are connected, respectively, are each defined as upstream or downstream, and between the communication apparatuses, data is transmitted in a predetermined direction from the upstream side to the downstream side or from the downstream side to the upstream side with upstream and downstream being defined from a specific communication apparatus serving as the starting point. In a communication system in which communication apparatuses are connected in series, communication is performed with a specific communication apparatus such as the uppermost stream side communication apparatus as the starting point. When an abnormality is detected in a communication with the communication apparatus on the upstream side, the communication apparatus itself that becomes the uppermost stream side transmits a candidate notification in order to become the specific communication apparatus serving as the starting point. Thereby, the other communication apparatuses can also recognize that the communication apparatus which is the uppermost stream side when the communication apparatus the communication of which is partly or wholly stopped because of the detection of the abnormality is excluded serves as the starting point next, and the communication path is redetermined by the communication apparatuses, so that the communication system can be restored.

According to the third aspect of the invention, in addition to the second aspect of the invention, when an abnormality is detected in a communication with the communication apparatus on the downstream side between the communication apparatuses where the abnormality is detected, the communication apparatus recognizes that it becomes the downmost stream side, and performs transmission so as to return a response to the candidate notification from the uppermost stream side communication apparatus serving as the starting point. The response from the downmost stream side is received by the communication apparatus transmitting the candidate notification, whereby the communication path can be determined and the communication system can be efficiently restored.

In the second and third aspects of the invention, the upstream side and the downstream side may be opposite. In this case, when an abnormality is detected in a communication with the communication apparatus on the downstream side, the communication apparatus transmits a candidate notification in order that the communication apparatus itself that becomes the downmost stream side becomes the specific communication apparatus serving as the starting point, and the communication apparatus that becomes the uppermost stream side transmits a response to the candidate notification.

According to the fourth aspect of the invention, the communication apparatuses each transmit a condition such as a condition where the effectiveness notification cannot be received although the effectiveness notification can be transmitted to the other communication apparatus by its own communication means or a condition where the effectiveness notification cannot be received from the other communication apparatus, to the other communication apparatus as information representative of the communication condition within a recognizable range. This enables communication that is responsive to the communication condition such as a condition where only communication from the upstream side to the downstream side is possible with the other communication apparatus having received the information representative of the communication condition or a condition where only communication from the downstream side to the upstream side is possible with the other communication apparatus. The restoration of the communication system can be realized flexibly according to the condition such as using a partly effective communication as well as the measure of separating the communication when an abnormality is detected therein.

According to the present invention, when a trouble occurs with some of the communication means that perform data transmission and reception of the communication apparatus, this can be detected by the communication apparatus itself or by an other communication apparatus, so that even when the communication apparatus itself does not detect the abnormality since the effectiveness notification is continuously received from the other communication apparatus, the abnormality detected by the other communication apparatus can be recognized based on the abnormality information. After the communication between the communication apparatuses where an abnormality is detected is stopped to thereby avoid influence on the entire system, the communication apparatus having detected the abnormality transmits information to the other communication apparatus in order to redetermine the communication path, and the communication apparatuses can automatically restore the function as the communication system while excluding the communication between the communication apparatuses the communication between which is partly or wholly stopped.

The above and further objects and features will more fully be apparent from the following detailed description with accompanying drawings.

DETAILED DESCRIPTION

Hereinafter, the present invention will be concretely described based on the drawings showing an embodiment thereof. In the embodiment described below, as an example, a case will be described where in a vehicle-mounted communication system in which a plurality of ECUs are connected and relay apparatuses that relay data transmission and reception between the ECUs are included, a communication apparatus according to the present invention is applied to the relay apparatuses.

Figure 1:
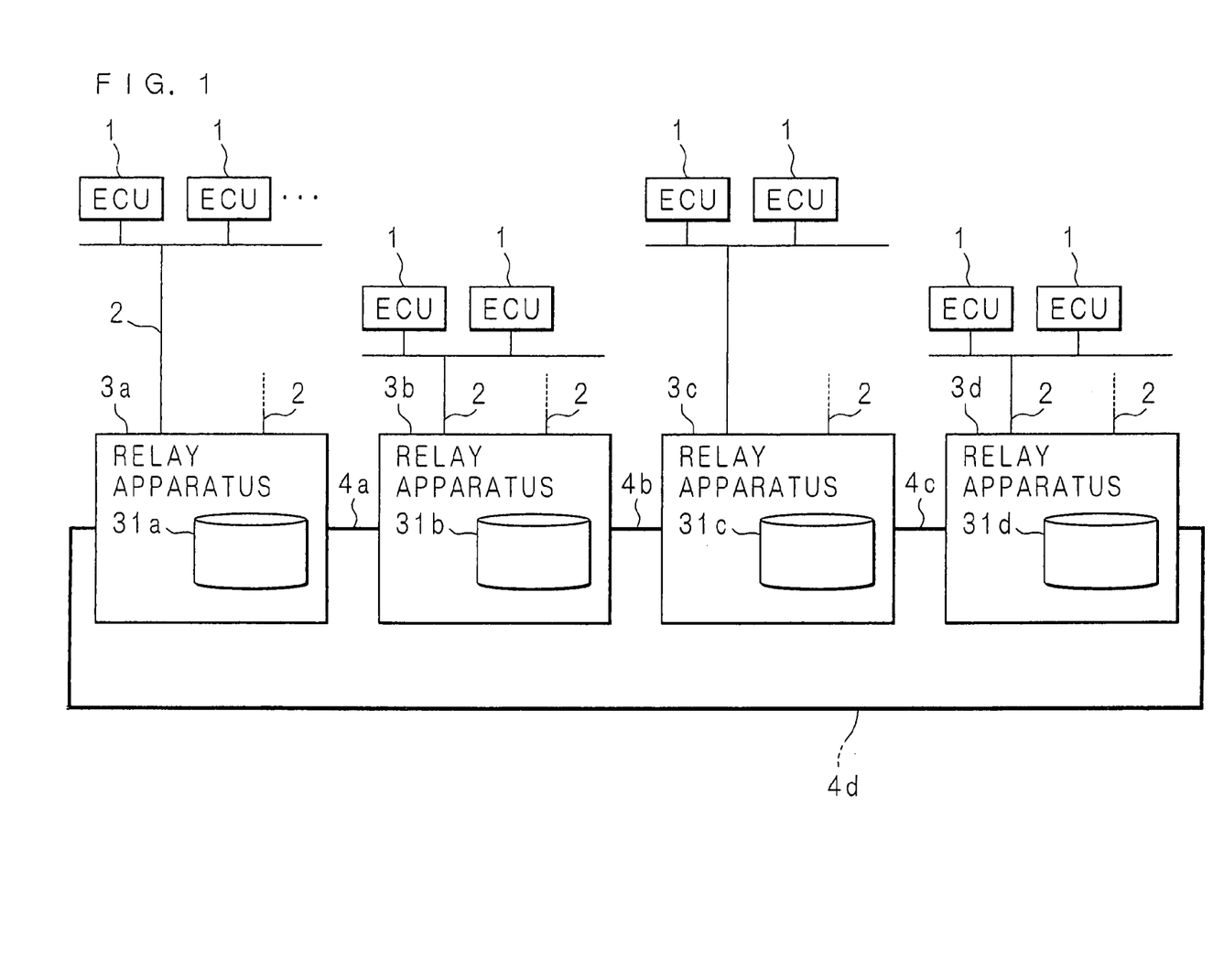
FIG. 1 is a block diagram showing the structure of a vehicle-mounted communication system according to an embodiment of the present invention.

FIG. 1 is a block diagram showing the structure of a vehicle-mounted communication system according to the present embodiment. The vehicle-mounted communication system is a communication apparatus that performs data transmission and reception, and includes: ECUs 1; communication lines 2 connecting the ECUs 1 group by group; relay apparatuses 3a, 3b, 3c and 3d connected to the communication lines 2, respectively, and relaying data transmission and reception between the ECUs 1; and communication lines 4a, 4b, 4c and 4d connecting the relay apparatuses 3a, 3b, 3c and 3d.

The vehicle-mounted communication system according to the present embodiment forms a trunk-type vehicle-mounted network in which the ECUs 1 are interconnected through the relay apparatuses 3a, 3b, 3c and 3d connected by the communication lines 4a, 4b, 4c and 4d serving as trunk lines. Hereinafter, for clarification of description, the communication lines 2 will be referred to as branch lines 2, and the communication lines 4a, 4b, 4c and 4d, as trunk lines 4a, 4b, 4c and 4d.

The ECUs 1 connect with the branch lines 2 in a bus form. This is because the ECUs 1 in the present embodiment transmit and receive data according to the protocol of the CAN (controller area network). However, the connection topology is not limited thereto. Any connection topology such as the star topology or the daisy-chain topology may be used.

The relay apparatuses 3a, 3b, 3c and 3d are connected in series through the trunk lines 4a, 4b, 4c and 4d. The relay apparatuses 3a and 3b, the relay apparatuses 3b and 3c, and the relay apparatuses 3c and 3d are interconnected through the trunk line 4a, the trunk line 4b and the trunk line 4c, respectively. The present embodiment adopts a redundant configuration in which the relay apparatus 3d and the relay apparatus 3a are interconnected by the trunk line 4d so that the system can be used when a trouble occurs in the communication on any of the trunk lines 4a, 4b and 4c.

In the vehicle-mounted communication system in which the apparatuses are connected as described above, the ECUs 1 are apparatuses capable of transmitting data including numerical information of various physical amounts such as measurement values, calculation values and control values or of controlling the engine, the brake or the like by a microcomputer. For example, one ECU 1 connected to the relay apparatus 3a through the branch line 2 functions as the ABS (antilock brake system), and is connected to a non-illustrated sensor that detects the rotation speed of the wheel (wheel speed). This ECU 1 controls the brake based on the wheel speed detected through the sensor in braking the vehicle, and transmits the measurement value of the wheel speed to the relay apparatus 3a through the branch line 2 as data.

The data transmitted from the ECUs 1 is constituted by a pair of an attribute ID (identification data) for identifying an attribute of data such as the wheel speed, the temperature or the angle and the concrete numerical information of the attribute (attribute value). For example, the data representing the wheel speed is constituted by a pair of the attribute ID assigned to the wheel speed and the attribute value. The numerical information also includes control values for switching between on and off, switching among high, middle and low, or the like which control values are expressed as numerical information (on: 1, off: 0, high: 1, middle: 0, low: −1). The data transmission and reception between the ECUs 1 and the relay apparatuses 3a, 3b, 3c and 3d is executed by the transmission and reception of a "message" where a plurality of pieces of data are gathered. In transmitting data, the vehicle-mounted apparatuses 1 transmit data groups obtained by their own operations, as a message.

As the branch lines 2, communication lines based on the protocol of the CAN are used. The ECUs 1 transmit and receive messages through the branch lines 2 based on the CAN protocol. When the ECUs 1 transmit a message based on the CAN protocol, the message includes a message ID, that is, "CAN ID" defined for each combination of a plurality of pieces of data, and attribute values according to the combination are transmitted at a time. The branch lines 2 are not limited thereto, but may be capable of message transmission and reception based on the protocol of the LIN (local interconnect network), FlexRay (trademark) or the like. The branch lines 2 may be communication lines of different protocols according to the kind of the data transmitted and received to and from the ECUs 1.

The relay apparatuses 3a, 3b, 3c and 3d have storage areas used as databases 31a, 31b, 31c and 31d, respectively, and basically, store the data transmitted from the ECUs 1 connected thereto through the branch lines 2, into the databases 31a, 31b, 31c and 31d, respectively. For example, the relay apparatus 3a transmits the data received from the ECUs 1, to the other relay apparatuses 3b, 3c and 3d, and stores the data received from the other relay apparatuses 3b, 3c and 3d, into the database 3a. Likewise, the other relay apparatuses 3b, 3c and 3d store the data received from the other relay apparatuses 3a, 3b, 3c and 3d into the databases 31b, 31c and 31d. Whereby, the databases 31a, 31b, 31c and 31d are synchronized so as to have the same contents. The relay apparatuses 3a, 3b, 3c and 3d transmit data read from the databases 31a, 31b, 31c and 31d to the ECUs 1. Whereby, the ECUs 1 connecting with the different branch lines 2 can use the same data.

Figure 2:
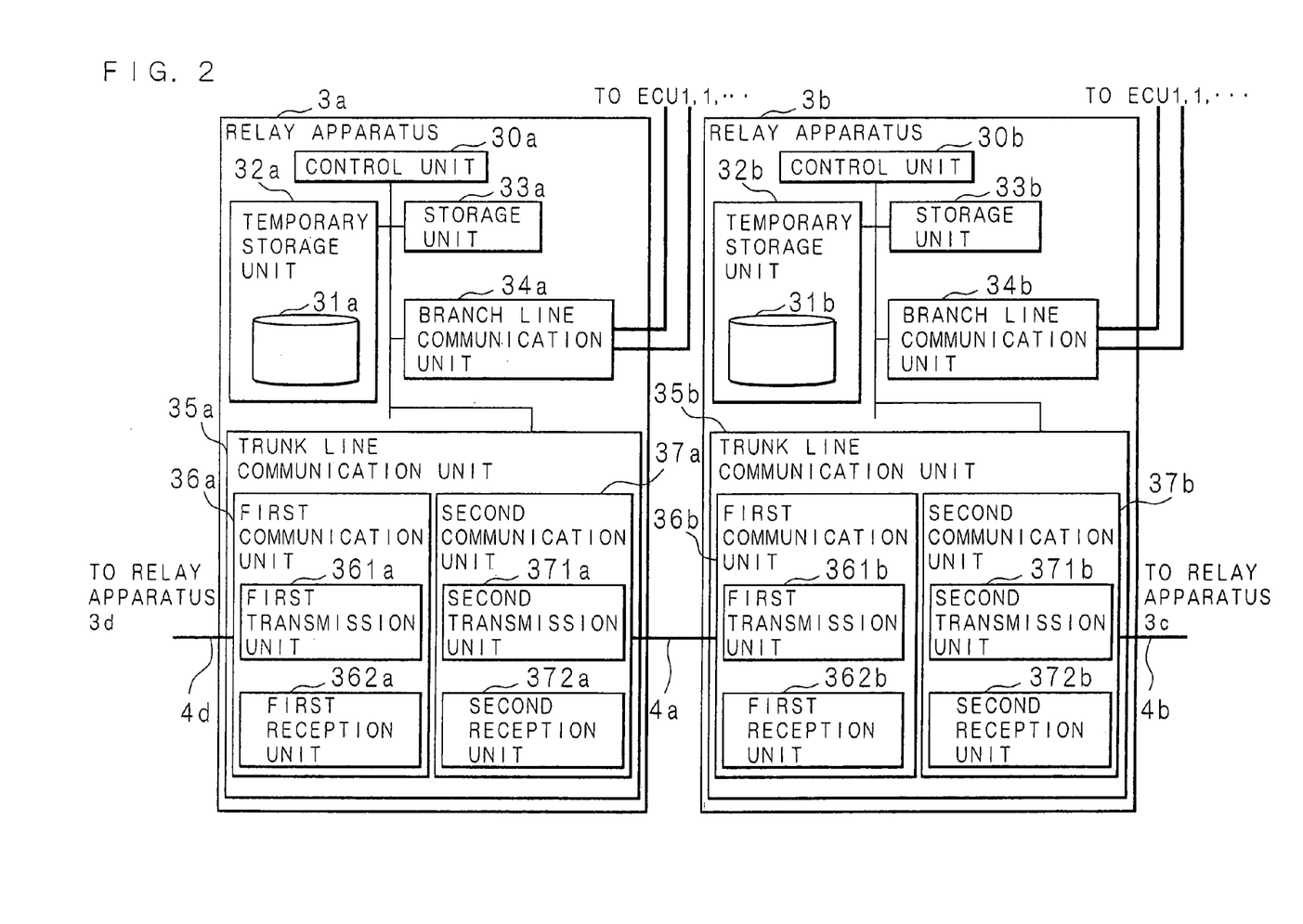
FIG. 2 is a block diagram showing the internal structure of relay apparatuses of the vehicle-mounted communication system according to the embodiment of the present invention.

FIG. 2 is a block diagram showing the internal structure of the relay apparatuses 3a and 3b of the vehicle-mounted communication system according to the present embodiment. The relay apparatus 3a is provided with: a control unit 30a for which a CPU (central processing unit), an MPU (micro processing unit) or the like is used and that controls the operations of the structural elements; a temporary storage unit 32a for which a volatile memory such as a DRAM (dynamic random access memory) or an SRAM (static random access memory) is used; a storage unit 33a for which a non-volatile memory such as an EPROM (erasable programmable read only memory), an EEPROM (electrically EPROM) or a flash memory is used; a branch line communication unit 34a connected to the branch lines 2; and a trunk communication unit 35a connected to the trunk lines 4a and 4d.

Since the internal structures of the relay apparatuses 3b, 3c and 3d are similar to that of the relay apparatus 3a, corresponding reference numerals are given, and detailed descriptions thereof are omitted.

The control unit 30a controls the operations of the structural elements by receiving power supply from a power supply device such as a non-illustrated vehicle alternator or battery.

The temporary storage unit 32a is provided with an area for the database 31a into which the control unit 30a stores data. The database 31a may be provided in an area in a storage device that is present outside the relay apparatus 3a, and be readable by the relay apparatus 3a by the relay apparatus 3a connecting therewith. The temporary storage unit 32a temporarily stores received data (messages) as well as the database 31a.

The storage unit 33a stores a program for implementing the later-described processing performed by the control unit 30a. The control unit 30a reads the program from the storage unit 33a and executes the processing.

The branch line communication unit 34a implements the data transmission and reception with the ECUs 1 connected through the branch lines 2. The data transmission and reception between the relay apparatus 3a and the ECUs 1 is executed by message transmission and reception as described above. The branch line communication unit 34a has a plurality of ports, and is capable of simultaneously transmitting and receiving messages by the ports.

The trunk line communication unit 35a implements communication with the relay apparatus 3b connected through the trunk line 4a and communication with the relay apparatus 3d connected through the trunk line 4d. Communication among the relay apparatuses 3a, 3b, 3c an 3d is implemented through the trunk lines 4a, 4b, 4c and 4d which are cables capable of two-way transmission and reception according to the protocol of Ethernet (trademark) or the like. The trunk line communication unit 35a has a first communication unit 36a connected to the trunk line 4d and a second communication unit 37a connected to the trunk line 4a. Specifically, the first communication unit 36a and the second communication unit 37a correspond to communication ports, respectively. The first communication unit 36a has a first transmission unit 361a and a first reception unit 362a. The second communication unit 37a has a second transmission unit 371a and a second reception unit 372a. The control unit 30a separately performs communication with the relay apparatus 3b and communication with the relay apparatus 3d by the trunk line communication unit 35a.

The trunk line communication unit 35a transmits a keepalive message representing that the trunk line communication unit 35a is alive, that is, that the transmission from the trunk line communication unit 35a is normally functioning, from the first transmission unit 361a and the second transmission unit 371a at regular intervals such as 500 microseconds or at a predetermined time such as when a predetermined time such as 500 microseconds has elapsed since the latest message transmission. When receiving the keepalive message and other messages by the first reception unit 362a and the second reception unit 372a, the trunk line communication unit 35a notifies the control unit 30a of the messages.

The keepalive message is, as a concrete example, a two-byte message. The first byte includes an ID representing that the message is a keepalive message (for example, 0xFE). The second byte includes abnormality information representing whether an abnormality is detected or not (abnormality detected: 1, abnormality not detected: 0). A third byte may be added so that the message further includes information representative of the abnormality condition of the communication when an abnormality is detected. The abnormality condition is information representing; for example, that only transmission is abnormal, that both transmission and reception are abnormal or why the abnormality is detected.

The control unit 30a periodically transmits and receives a synchronization message for synchronizing the contents of the databases 31a, 31b, 31c and 31d, to and from other relay apparatuses 3b and 3d by the trunk line communication unit 35a at regular periods such as one millisecond. When this is done, initially, the relay apparatuses 3a, 3b, 3c and 3d perform communication by the following communication path: Of the relay apparatuses 3a, 3b, 3c and 3d connected in the ring topology as a redundant configuration, communication between the relay apparatuses 3a and 3d through the trunk line 4d is stopped, the relay apparatus 3a serves as the master, and communication is performed by a communication path in the order of the relay apparatuses 3a, 3b, 3c, and 3d with the relay apparatus 3a as the starting end and the relay apparatus 3d as the terminating end. Specifically, synchronization is completed when a synchronization message transmitted from the relay apparatus 3a serving as the master is received by the relay apparatus 3d by way of the relay apparatuses 3b and 3c, the relay apparatus 3d at the terminating end having received all the synchronization messages from the relay apparatuses 3a, 3b and 3c returns a response representing that all the synchronization messages have been received and the response is relayed in the order of the relay apparatuses 3c and 3b and received by the relay apparatus 3a serving as the master.

Thus, communication by the first communication unit 36a in the trunk line communication unit 35a of the relay apparatus 3a serving as the master is stopped initially. Likewise, communication by the first communication unit 36d in the trunk line communication unit 35d of the relay apparatus 3d at the terminating end is also stopped initially.

A keepalive message transmission processing, an abnormality detection processing, and a restoration processing performed when an abnormality is detected will be described. These processings are executed by the relay apparatuses 3a, 3b, 3c and 3d in the vehicle-mounted communication system structured as described above while the communication processing for synchronizing the contents of the databases 31a, 31b, 31c and 31d is performed among the relay apparatuses 3a, 3b, 3c and 3d.

Figure 3:
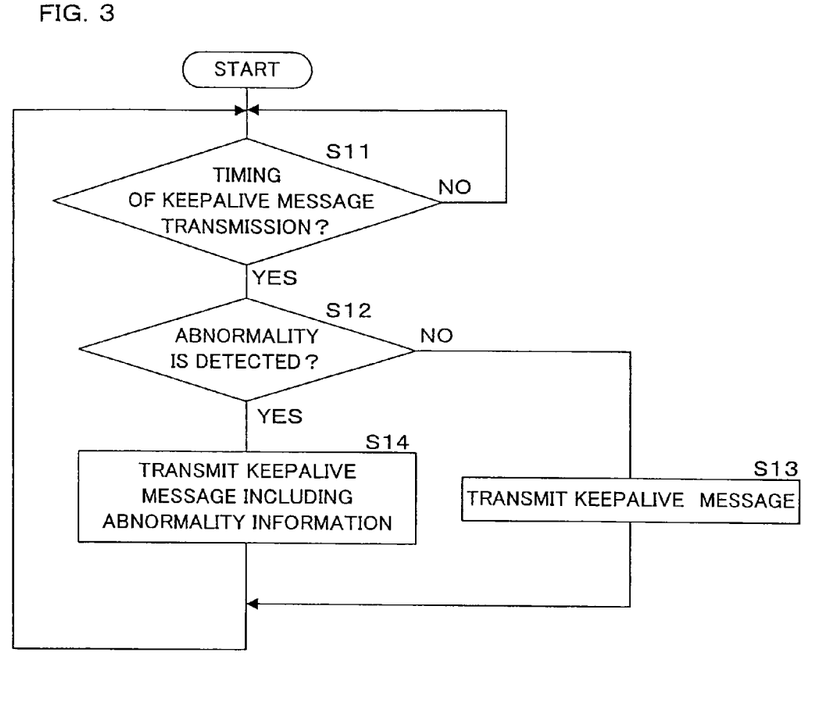
FIG. 3 is a flowchart showing an example of the procedure by which a keepalive message is transmitted from a relay apparatus in the embodiment of the present invention.

FIG. 3 is a flowchart showing an example of the procedure by which a keepalive message is transmitted from the relay apparatus 3a in the present embodiment. Since the processing procedures for the other relay apparatuses 3b, 3c and 3d are similar to that for the relay apparatus 3a, detailed descriptions thereof are omitted.

In the relay apparatus 3a, the trunk line communication unit 35a determines whether the timing of keepalive message transmission from the second transmission unit 371a has come or not (step S11). When determining that the transmission timing has not come (S11: NO), the trunk line communication unit 35a returns the process to step S11, and waits until the transmission timing comes. When determining that the transmission timing has come (S11: YES), the trunk line communication unit 35a determines whether or not an abnormality is detected by the second communication unit 37a connecting with the relay apparatus 3b which is the destination of the keepalive message (step S12). At this time, abnormality detection is performed in the processing described later (see FIG. 4), and when an abnormality is detected, the detection of the abnormality is written into a memory or a register so that the second communication unit 37a can recognize it.

When determining that no abnormality is detected by the second communication unit 37a (S12: NO), the trunk line communication unit 35a transmits a keepalive message including abnormality information representing that no abnormality is detected (step S13), and returns the process to step S11. When determining that an abnormality is detected by the second communication unit 37a (S12: YES), the trunk line communication unit 35a transmits a keepalive message including abnormality information representing that the abnormality is detected in the communication with the relay apparatus 3b (step S14), returns the process to step S11, and waits until the next transmission timing comes. Thereafter, the processings of steps S11 to S14 are repeated until communication by the second communication unit 37a is stopped.

In the above-described processing procedure, since communication by the first communication unit 36a of the relay apparatus 3a is stopped initially, a description thereof is omitted. However, when the relay apparatus 3a performs communication with the relay apparatus 3d through the first communication unit 36a, the keepalive message transmission from the second transmission unit 371a of the second communication unit 37a in the above-described processing procedure is performed also by the first transmission unit 361a of the first communication unit 36a.

Initially, the keepalive message transmission is performed similarly to the processing shown in the flowchart of FIG. 3 from both of the first transmission unit 361b and the second transmission unit 371b in the trunk line communication unit 35b of the relay apparatus 3b and from both of the first transmission unit 361c and the second transmission unit 371c in the trunk line communication unit 35c of the relay apparatus 3c. In the trunk line communication unit 35d of the relay apparatus 3d, the keepalive message transmission similar to the processing shown in the flowchart of FIG. 3 is performed only from the first transmission unit 361d.

Figure 4:
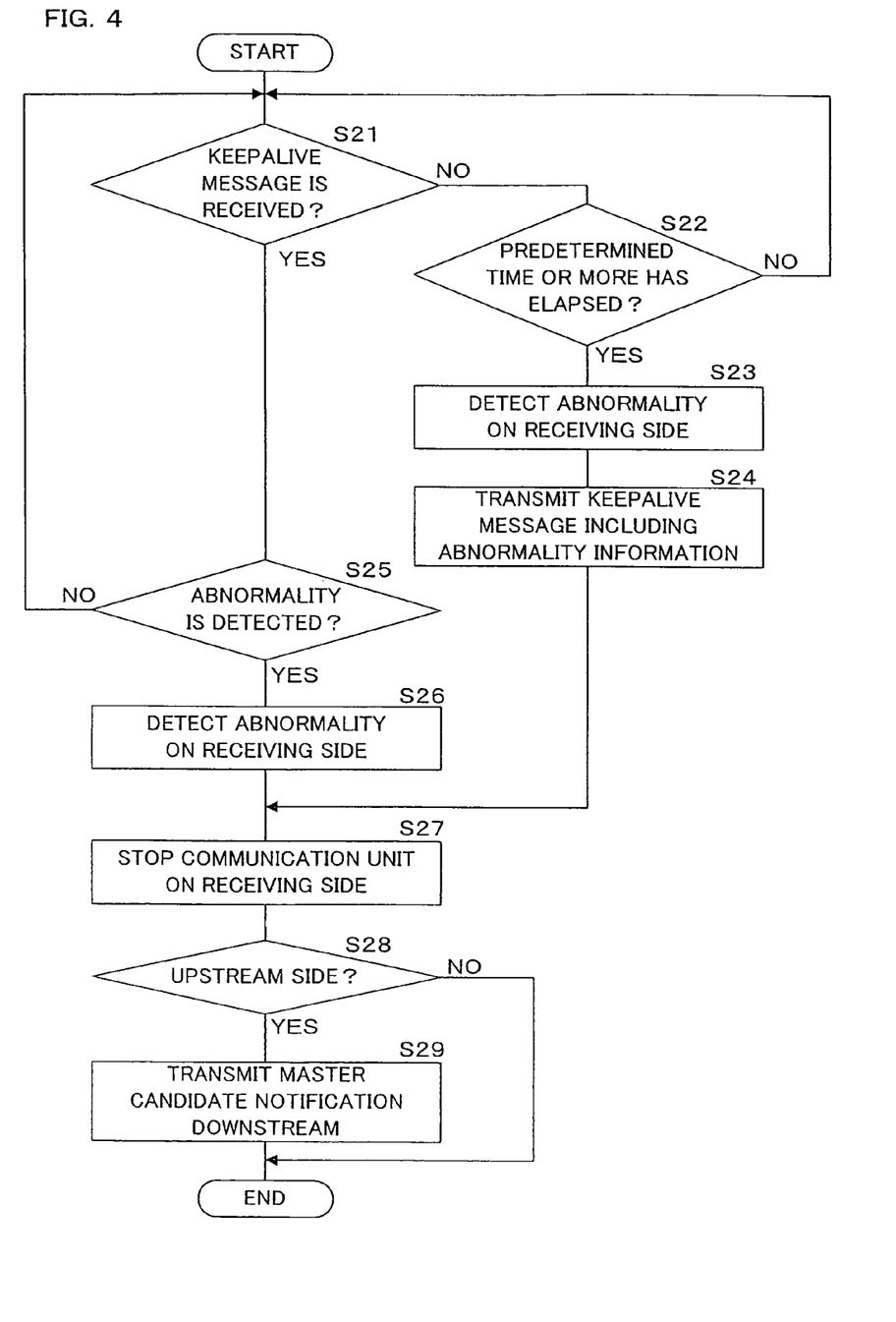
FIG. 4 is a flowchart showing an example of the processing procedure executed by a control unit of the relay apparatus when an abnormality is detected in the embodiment of the present invention.

Next, the abnormality detection processing and the restoration processing performed when an abnormality is detected will be described. FIG. 4 is a flowchart showing an example of the processing procedure executed when the control unit 30a of the relay apparatus 3a detects an abnormality in the present embodiment. Since the processing procedures for the other relay apparatuses 3b, 3c and 3d are similar to that for the relay apparatus 3a, detailed descriptions thereof are omitted.

The control unit 30a determines whether or not a keepalive message is received by the first reception unit 362a or the second reception unit 372a (step S21). Specifically, the control unit 30a determines whether a notification in response to the reception of a keepalive message from the first reception unit 362a or the second reception unit 372a is received or not. Since communication by the first communication unit 36a is initially stopped in the relay apparatus 3a, only whether a keepalive message is received by the second reception unit 372a or not is necessarily determined.

When determining that no keepalive message is received (S21: NO), the control unit 30a determines whether or not a predetermined time such as one millisecond or more has elapsed since the latest reception of a keepalive message or a different message (step S22). When determining that the predetermined time or more has not elapsed (S22: NO), the control unit 30a returns the process to step S21, and waits until a keepalive message is received.

When determining that the predetermined time or more has elapsed at step S22 (S22: YES), the control unit 30a recognizes that an abnormality is detected in the communication with the relay apparatus 3b or the relay apparatus 3d on the receiving side (step S23), and transmits a keepalive message including abnormality information representative of the detection of the abnormality from a communication unit corresponding to the receiving side that detects the abnormality (step S24). At step S24, when the control unit 30a recognizes that an abnormality is detected on the second reception unit 372a side, information representing that the cause of the abnormality detection is that no keepalive message can be received from the second reception unit 372a side, that is, from the relay apparatus 3b may be included in the keepalive message as the abnormality condition. Information representing that a trouble occurs in the communication from the relay apparatus 3b to the relay apparatus 3a may be included as the abnormality condition. Moreover, the control unit 30a may write the detection of an abnormality into a memory or a register so that the first transmission unit 361a or the second transmission unit 371a can recognize it in order to transmit a keepalive message including abnormality information at the time of the transmission of a keepalive message by the communication unit corresponding to the receiving side where the abnormality is detected. In this case, step S24 is omitted.

When determining that a keepalive message is received at step S21 (S21: YES), the control unit 30a determines whether the abnormality information included in the keepalive message represents or not that an abnormality is detected (step S25). When determining that the abnormality information included in the received keepalive message does not represent that an abnormality is detected (S25: NO), the control unit 30a returns the process to step S21, and waits until a keepalive message is newly received.

When determining that the abnormality information included in the received keepalive message represents that an abnormality is detected at step S25 (S25: YES), the control unit 30a recognizes that an abnormality is detected in the communication with the relay apparatus 3b or the relay apparatus 3d on the receiving side (step S26).

When recognizing that an abnormality is detected at step S26 and when recognizing that an abnormality is detected in the communication at step S23 and transmitting a keepalive message including abnormality information at step S24, the control unit 30a stops the first communication unit 36a or the second communication unit 37a by the communication unit corresponding to the receiving side that detects the abnormality (step S27). Then, the control unit 30a determines whether the stopped first communication unit 36a or second communication unit 37a is on the upstream side or not (step S28).

When determining that the stopped first communication unit 36a or second communication unit 37a is not on the upstream side (S28: NO), the control unit 30a recognizes that the control unit 30a itself is to become the terminating end on the most downstream side, and ends the process. As described later, when a master candidate notification is transmitted from any of the other relay apparatuses 3b, 3c and 3d, the control unit 30a of the relay apparatus 3a recognizing that the control unit 30a itself is to become the terminating end returns a response to the master candidate notification to the upstream side.

When the control unit 30a determines that the stopped first communication unit 36a or second communication unit 37a is on the upstream side (S28: YES), since the control unit 30a itself serves as the master on the uppermost stream side, the control unit 30a transmits a master candidate notification downstream from a communication unit on the downstream side (step S29), and ends the process.

Next, the processings shown in the flowcharts of FIGS. 3 and 4 will be described with reference to concrete examples. FIGS. 5 to 9 are explanatory views showing concrete examples of the process of redetermining the communication path by the processings by the relay apparatuses 3a, 3b, 3c and 3d in the present embodiment.

Figure 5:
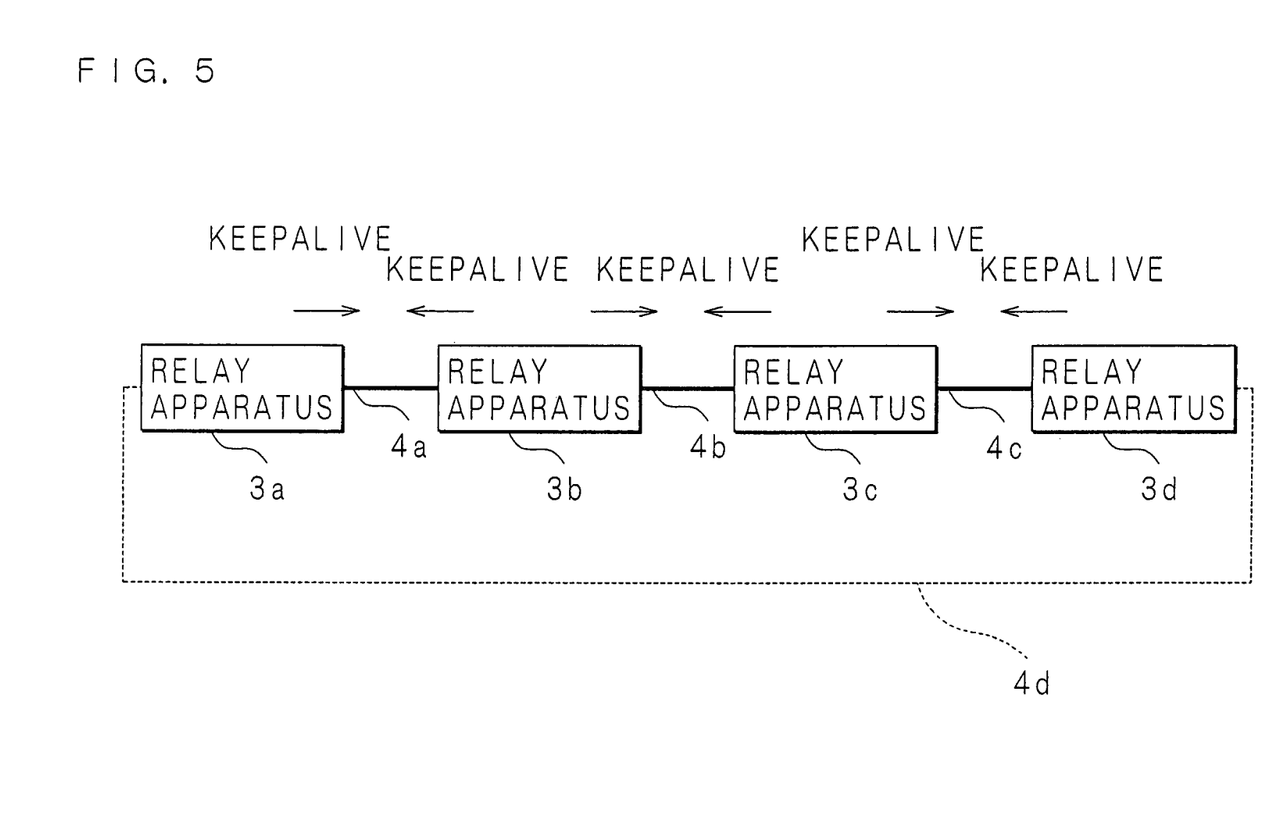
FIG. 5 is an explanatory view showing a concrete example of the process of redetermining the communication path by the processing by the relay apparatus in the embodiment of the present invention.

FIG. 5 showing the initially set communication path depicts a condition where communication is normally performed with no abnormality being detected in any of the relay apparatuses 3a, 3b, 3c and 3d. The thick lines in FIG. 5 indicate the effective communication path. As shown in FIG. 5, of the relay apparatuses 3a, 3b, 3c and 3d connected in the ring topology as a redundant configuration, the relay apparatus 3a is the master initially, and communication is performed by a communication path in the order of the relay apparatuses 3a, 3b, 3c and 3d.

The relay apparatus 3a continuously transmits a keepalive message from the second transmission unit 371a of the second communication unit 37a connected to the relay apparatus 3b through the trunk line 4a, and the first communication unit 36a connected to the relay apparatus 3d through the trunk line 4d is stopped initially. The relay apparatus 3b continuously transmits a keepalive message from both the first transmission unit 361b of the first communication unit 36b on the relay apparatus 3a side and the second transmission unit 371b of the second communication unit 37b on the relay apparatus 3c side. Likewise, the relay apparatus 3c continuously transmits a keepalive message from both the first transmission unit 361c of the first communication unit 36c on the relay apparatus 3b side and the second transmission unit 371c of the second communication unit 37c on the relay apparatus 3d side. The relay apparatus 3d at the terminating end continuously transmits a keepalive message from the first transmission unit 361d of the first communication unit 36d on the relay apparatus 3c side, and the second communication unit 37d is stopped initially.

The relay apparatus 3a receives a keepalive message transmitted from the relay apparatus 3b, by the second reception unit 372a of the second communication unit 37a. The relay apparatus 3b receives a keepalive message transmitted from the relay apparatus 3a, by the first reception unit 362b of the first communication unit 36b, and receives a keepalive message transmitted from the relay apparatus 3c, by the second reception unit 372b of the second communication unit 37b. The relay apparatus 3c receives a keepalive message transmitted from the relay apparatus 3b, by the first reception unit 362c of the first communication unit 36c, and receives a keepalive message transmitted from the relay apparatus 3d, by the second reception unit 372c of the second communication unit 37c. The relay apparatus 3d receives a keepalive message transmitted from the relay apparatus 3c, by the first reception unit 362d of the first communication unit 36d. While the relay apparatuses 3a, 3b, 3c and 3d are receiving keepalive messages by their respective reception units, communication is normal, and the contents of the databases 31a, 31b, 31c and 31d are periodically synchronized.

Figure 6:
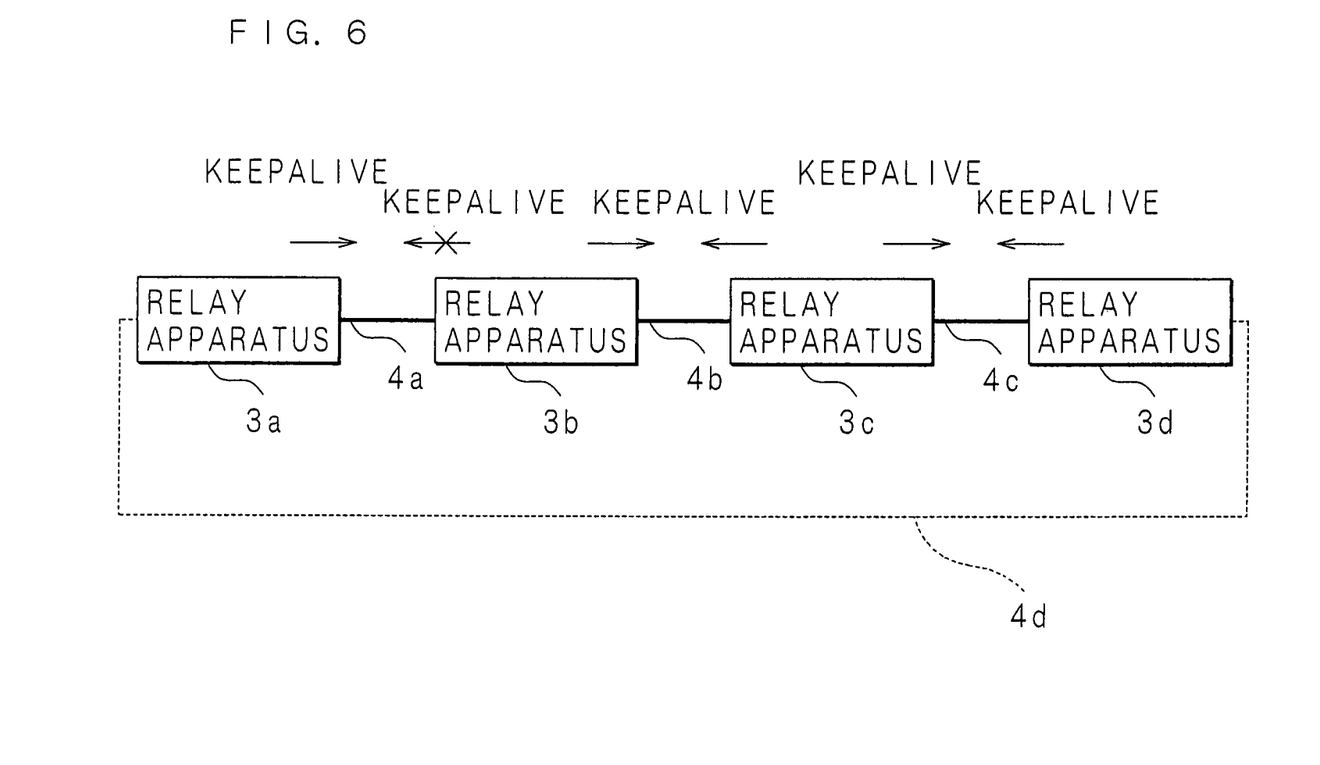
FIG. 6 is an explanatory view showing a concrete example of the process of redetermining the communication path by the processing by the relay apparatus in the embodiment of the present invention.

FIG. 6 shows an example of a case where a trouble occurs in a communication between the relay apparatus 3a and the relay apparatus 3b. In FIG. 6, it is assumed that the first transmission unit 361b of the first communication unit 36b of the relay apparatus 3b is out of order and only transmission is impossible. This may be a case where the line between the first transmission unit 361b of the relay apparatus 3b and the second reception unit 372a of the relay apparatus 3a on the trunk line 4a is cut and only data transmission from the relay apparatus 3b to the relay apparatus 3a is impossible.

In this case, the relay apparatus 3b detects no abnormality in the communication with the relay apparatus 3a since a keepalive message from the relay apparatus 3a can be received by the first reception unit 362b of the first communication unit 36b while a keepalive message cannot be transmitted from the first transmission unit 361b. On the contrary, the relay apparatus 3a determines that the predetermined time or more has elapsed without a keepalive message being received by the second reception unit 372a (FIG. 4, S22: YES), and detects an abnormality on the relay apparatus 3b side (the same figure, S22). At this time, since the stopped second communication unit 37a is on the downstream side (the same figure, S28: NO), the communication path is changed, and the relay apparatus 3a recognizes that the relay apparatus 3a itself is to become the terminating end. Although the first communication unit 36a is stopped since the relay apparatus 3a is initially on the uppermost stream side, the relay apparatus 3a makes communication by the first communication unit 36a effective by recognizing that the relay apparatus 3a itself is to become the terminating end, and waits until a master candidate notification described later is received. Other relay apparatuses 3c and 3d continuously receive keepalive messages.

Figure 7:
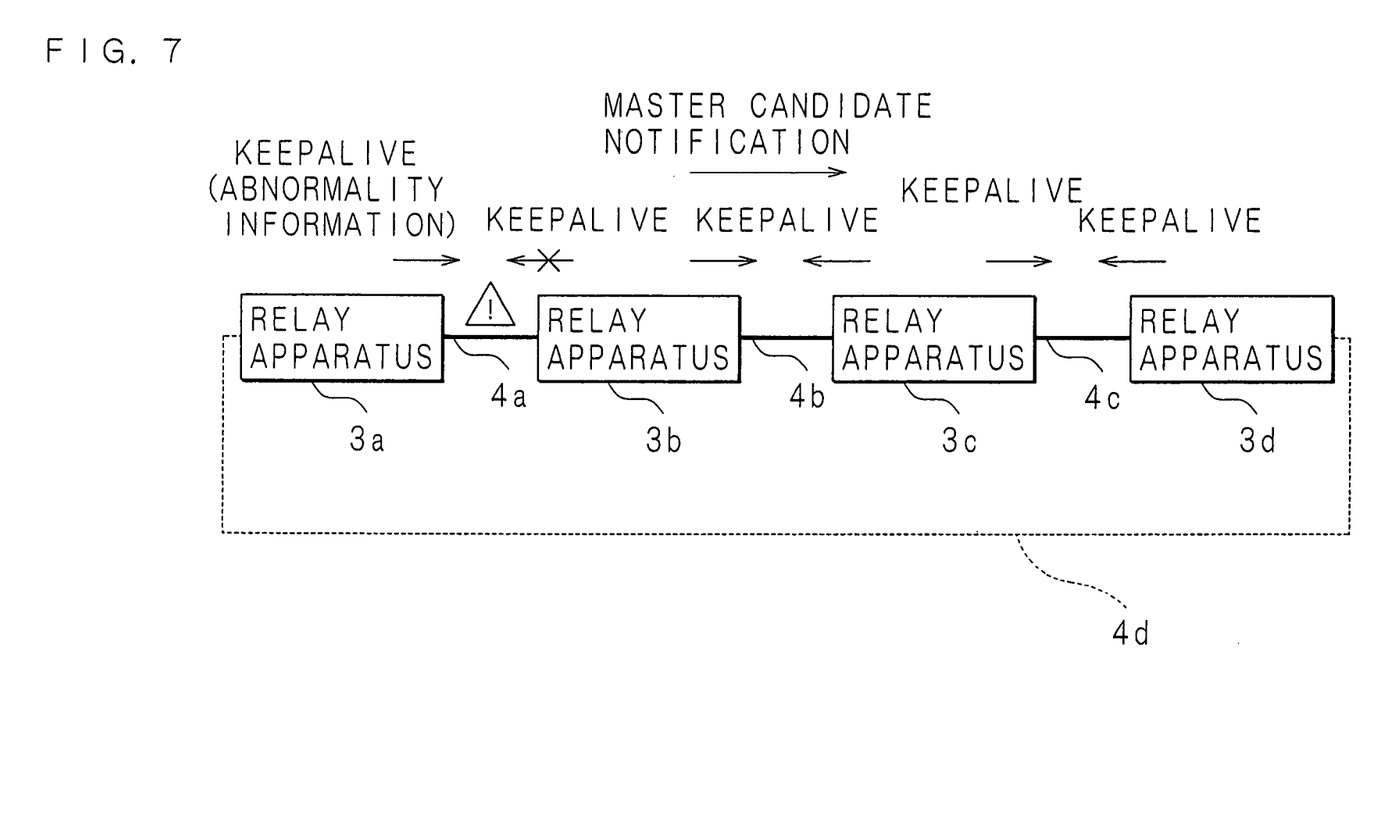
FIG. 7 is an explanatory view showing a concrete example of the process of redetermining the communication path by the processing by the relay apparatus in the embodiment of the present invention.

FIG. 7 shows an example of the processing performed after the relay apparatus 3a detects an abnormality in the communication with the relay apparatus 3b through the trunk line 4a. As shown in FIG. 7, by detecting an abnormality in the communication with the relay apparatus 3b, the relay apparatus 3a transmits a keepalive message including abnormality information representing that the abnormality is detected, from the second transmission unit 371a of the second communication unit 37a. The relay apparatus 3b continuously receives a keepalive message from the relay apparatus 3a by the first reception unit 362b. Consequently, the relay apparatus 3b receives the keepalive message including the abnormality information transmitted from the relay apparatus 3a (FIG. 3, S21: YES), determines that the abnormality information represents the detection of an abnormality (the same figure, S25: YES), and detects an abnormality in the communication on the relay apparatus 3a side (the same figure, S26).

Then, the relay apparatus 3b stops the communication by the first communication unit 36b (the same figure, S27), and since the first communication unit 36b is on the upstream side (the same figure, S28: YES), the relay apparatus 3b transmits a master candidate notification from the second transmission unit 371b of the second communication unit 37b to the relay apparatus 3c so that the relay apparatus 3b itself is the master, that is, the uppermost stream side on the communication path.

Figure 8:
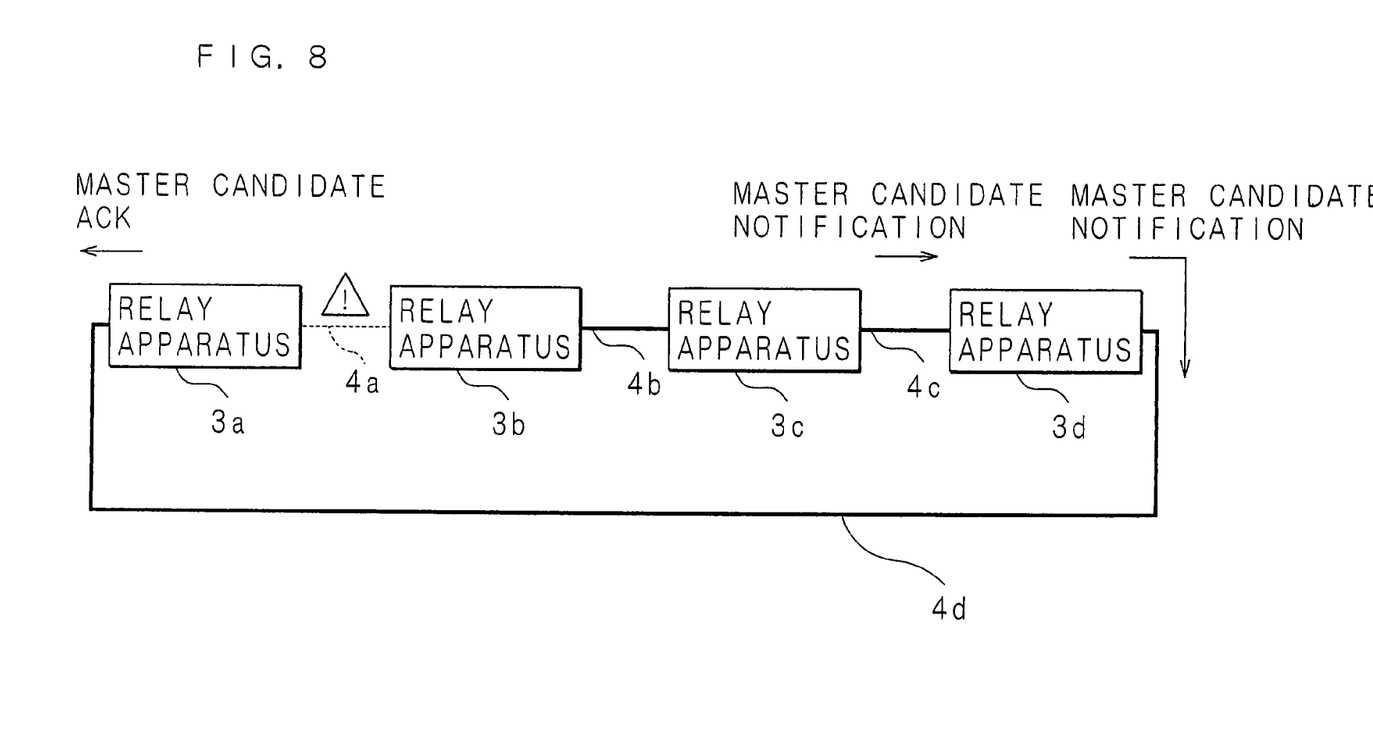
FIG. 8 is an explanatory view showing a concrete example of the process of redetermining the communication path by the processing by the relay apparatus in the embodiment of the present invention.

FIG. 8 shows an example of the processing in which the master candidate notification transmitted from the relay apparatus 3b is relayed and responded to. As shown in FIG. 8, when receiving the master candidate notification transmitted from the relay apparatus 3b, after recognizing that the communication path is to be changed, the relay apparatus 3c transmits the master candidate notification from the second transmission unit 371c of the second communication unit 37c to relay it to the relay apparatus 3d on the downstream side since the second communication unit 37c on the downstream side is already effective and no abnormality is detected in the communication. When receiving the master candidate notification relayed from the relay apparatus 3c, the relay apparatus 3d recognizes that the communication path is to be changed. Since the relay apparatus 3d does not recognize that the relay apparatus 3d itself is to become the terminating end, the relay apparatus 3d makes effective the communication by the second communication unit 37d on the downstream side the communication by which is stopped, and relays the master candidate notification by the second transmission unit 371d of the second communication unit 30d. The relay apparatus 3a having made the communication by the first communication unit 36a effective and waiting until the reception of the master candidate notification described later receives the master candidate notification relayed by the relay apparatus 3d, by the first reception unit 362a of the first communication unit 36a. Since the relay apparatus 3a recognizes that the relay apparatus 3a itself is to become the terminating end by detecting the abnormality by the second communication unit 37a on the downstream side, the relay apparatus 3a returns a master candidate ACK which is a response to the master candidate notification, by the first transmission unit 361a of the first communication unit 36a. The master candidate ACK is received by the relay apparatus 3d, relayed to the relay apparatus 3c, and relayed to the relay apparatus 3b also by the relay apparatus 3c. The relay apparatus 3b receives the master candidate ACK by the second reception unit 372b of the second communication unit 37b, and thereafter, continues the processing while recognizing that the relay apparatus 3b itself is the master.

Figure 9:
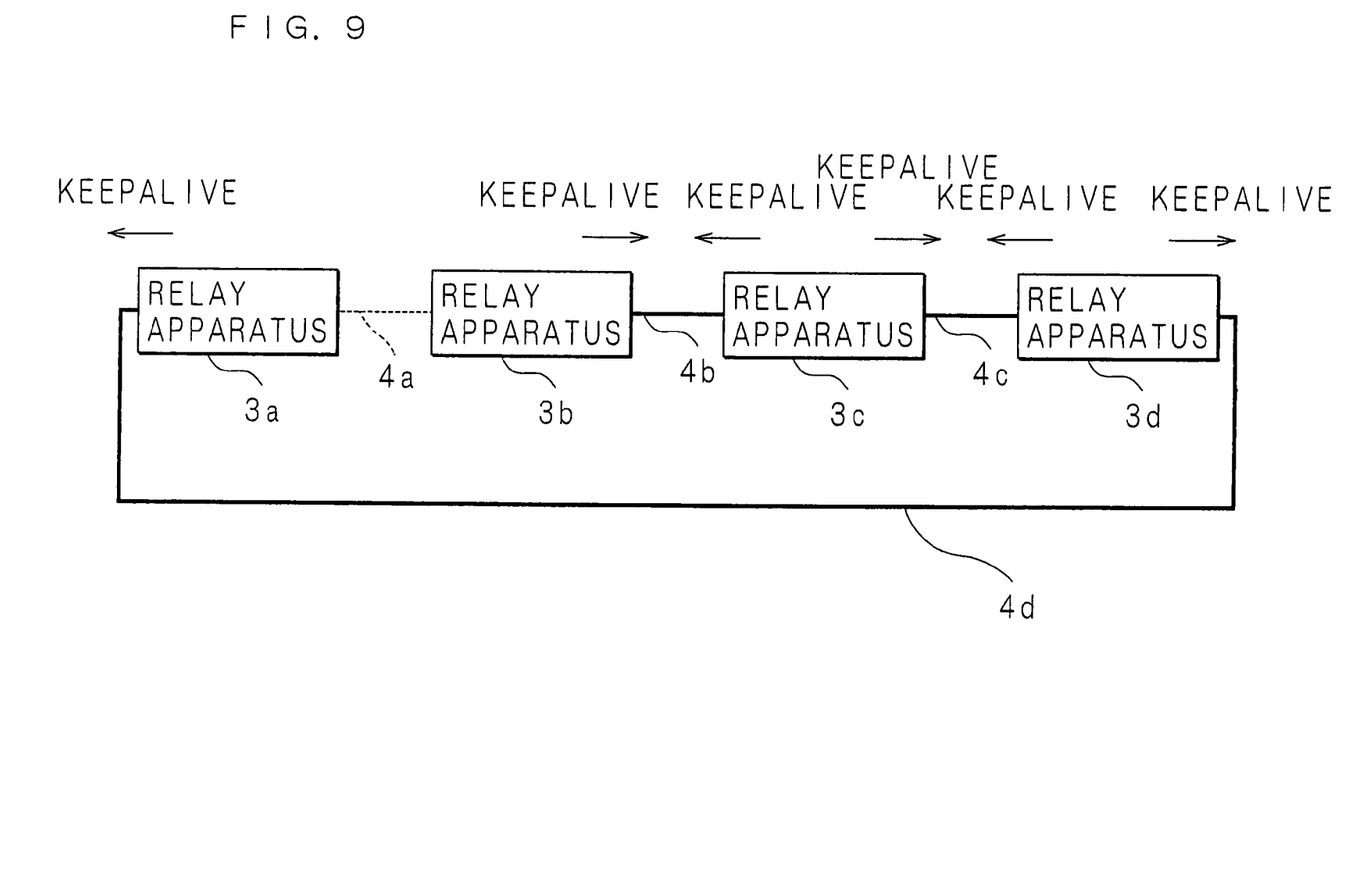
FIG. 9 is an explanatory view showing a concrete example of the process of redetermining the communication path by the processing by the relay apparatus according to the embodiment of the present invention.

FIG. 9 shows an example of the redetermined communication path. As described above, after an abnormality in the communication between the relay apparatus 3a and the relay apparatus 3b is detected, by having received a keepalive message including abnormality information from the relay apparatus 3a, the relay apparatus 3b transmits a master candidate notification, and in response thereto, the relay apparatus 3a returns a master candidate ACK, whereby the communication path is redetermined. On the redetermined communication path, as shown by the broken line in FIG. 9, the communication between the relay apparatus 3a and the relay apparatus 3b on the trunk line 4a is invalidated and stopped. Then, as shown by the thick lines in FIG. 9, the relay apparatus 3b serves as the master, and communication is performed by a communication path in the order of the relay apparatuses 3b, 3c, 3d and 3a with the relay apparatus 3b as the starting end and the relay apparatus 3a as the terminating end. The relay apparatuses 3a, 3b, 3c and 3d transmit a keepalive message, and detect an abnormality when a trouble occurs also thereafter.

As shown in FIGS. 5 to 9, by including abnormality information in the keepalive message, even when an abnormality cannot be detected based on whether a keepalive message is received or not in a case where reception is continuously possible and a trouble occurs as to transmission, the abnormality detected by another relay apparatus 3a can be recognized. It is possible to stop the communication in which the abnormality is detected and with this, execute processing in order to redetermine the communication path. Thereby, communications among the relay apparatuses 3a, 3b, 3c and 3d can be restored. Moreover, the relay apparatus 3b having detected the abnormality transmits a candidate notification in order to change the communication path, whereby the other communication apparatuses can recognize that the communication path is changed and it is possible to restore the second communication unit 37d and the like that are partly invalidated and change the communication path.

Moreover, on the communication path among the relay apparatuses 3a, 3b, 3c and 3d connected in series, the relay apparatus 3b having detected an abnormality on the upstream side transmits a master candidate notification in order that the relay apparatus 3b itself becomes the master, and the relay apparatus 3a having detected an abnormality on the downstream side transmits a response when receiving a master candidate notification while recognizing that the relay apparatus 3a itself is to become the terminating end, whereby the processing up to the redetermination of the communication path becomes efficient.

According to the present invention, even in a structure in which data transmission and reception is initially performed by a ring-topology communication path in the order of the relay apparatuses 3a, 3b, 3c, 3d, 3a, 3b, . . . , when a trouble occurs in the communication between the relay apparatuses 3a and 3b, change can be made so that data transmission and reception is performed in the order of the relay apparatuses 3a, 3b, 3c, 3d, 3c, 3b, . . . like a communication of the daisy-chain topology with the relay apparatus 3b as the starting end and the relay apparatus 3a as the terminating end.

As described above, according to the present invention, by adopting the ring topology or the daisy-chain topology as the connection topology, the number of communication lines is reduced and the weight of the vehicle-mounted system is reduced. In addition, for a problem in that the entire system ceases functioning when a trouble occurs in some communications since apparatuses are connected in series for communication, efficient restoration can be automatically performed.

Moreover, in the concrete examples shown in FIGS. 5 to 9, the relay apparatus 3a can recognize that transmission to the relay apparatus 3b is possible without any abnormality, and likewise, the relay apparatus 3b can recognize that reception is possible without any abnormality although transmission to the relay apparatus 3a is impossible. At this time, by including abnormality condition information representative of the cause of the abnormality and the like in the third byte of the keepalive message, the relay apparatus 3b can further recognize the contents of the abnormality and perform appropriate processing. In this case, a structure may be adopted in which the relay apparatuses 3a and 3b do not stop the second communication unit 37a and the first communication unit 36b, respectively, and use them as an exceptional communication path. For data that can be judged as being to quickly reach the relay apparatus 3a, the relay apparatus 3a may, for example, transmit it from the second communication unit 37a to the relay apparatus 3a through the trunk line 4a as an exception.

In the vehicle-mounted communication system according to the present embodiment, an example is shown in which the four relay apparatuses 3a, 3b, 3c and 3d are interconnected in the daisy-chain topology. The present invention is not limited thereto. The number of relay apparatuses is not limited to four, but may be, for example, 2, 3, or 5.

It is to be noted that the disclosed embodiment is not limitative but illustrative in all aspects. The scope of the invention is defined not by the description given above but by the appended claims, and all changes and modifications that fall within the definition and scope equivalent to the claims are to be embraced.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication apparatus comprising:
a trunk line communication unit to transmit and receive data to and from an other communication apparatus, the trunk line communication unit comprising:
a transmission unit to transmit an effectiveness notification representing that communication is effective to the other communication apparatus; and
a reception unit to receive the effectiveness notification from the other communication apparatus; and
a control unit to stop part or all of the communication with the other communication apparatus when an abnormality in the communication with the other communication apparatus is detected by not having received the effectiveness notification from the other communication apparatus or by having received abnormality information from the other communication apparatus; wherein:
the communication apparatus detects the abnormality in a communication with the other communication apparatus based on whether the effectiveness notification is received from the other communication apparatus or not;
the transmission unit transmits the abnormality information representing that the abnormality is detected and information representative of an abnormality condition of the communication to the other communication apparatus together with the effectiveness notification when the abnormality in the communication with the other communication apparatus is detected;
the transmission unit transmits information for changing a communication path with a third communication apparatus when the abnormality in the communication with the other communication apparatus is detected;
the trunk line communication unit has a plurality of communication units defined as either upstream or downstream on the communication path, and separately transmits and receives data to and from other communication apparatuses; and
when an abnormality in a communication with a communication apparatus on the upstream side is detected or when the abnormality information received together with the effectiveness notification through a first communication unit on the upstream side represents that an abnormality is detected, the transmission unit transmits a master candidate notification to a communication apparatus on the downstream side through a second communication unit on the downstream side in order that its own communication apparatus becomes a specific communication apparatus serving as a starting point on the communication path, and
when an abnormality in a communication with the communication apparatus on the downstream side is detected or when the abnormality information received together with the effectiveness notification through the second communication unit represents that an abnormality is detected, the transmission unit transmits a response to the master candidate notification to the communication apparatus on the upstream side through the first communication unit in order that its own communication apparatus becomes a termination point on the communication path.

2. The communication apparatus according to claim 1, wherein
the transmission unit transmits information representative of a communication condition together with the effectiveness notification by the trunk line communication unit.

3. The communication apparatus according to claim 1, wherein
the transmission unit transmits information representative of a communication condition together with the effectiveness notification by the trunk line communication unit.

4. A communication system comprising:
a plurality of communication apparatuses having trunk line communication units for transmitting and receiving data connected in a ring topology or in a daisy-chain topology through a communication line, the plurality of communication apparatuses being configured to transmit and receive data between each other with one of the plurality of communication apparatuses serving as a starting point on a communication path, wherein:
a first communication apparatus of the plurality of communication apparatuses comprises a transmission unit to transmit an effectiveness notification representing that communication is effective to a second communication apparatus of the plurality of communication apparatuses by a trunk line communication unit and a reception unit to receive an effectiveness notification from the second communication apparatus,
an abnormality is detected in a communication with the second communication apparatus based on whether the effectiveness notification is received from the second communication apparatus or not,
the transmission unit transmits abnormality information representing that the abnormality is detected and information representative of an abnormality condition of the communication to the second communication apparatus together with the effectiveness notification when the abnormality in the communication with the second communication apparatus is detected,
the transmission unit transmits information for changing a communication path with a third communication apparatus of the plurality of communication apparatuses when the abnormality in the communication with the second communication apparatus is detected by not having received the effectiveness notification from the second communication apparatus or by having received the abnormality information from the second communication apparatus,
when an abnormality in a communication with an upstream communication apparatus is detected or when abnormality information received together with an effectiveness notification through an upstream trunk line communication unit represents that an abnormality is detected, the transmission unit transmits a master candidate notification to a downstream communication apparatus through a downstream trunk line communication unit in order that the downstream communication apparatus becomes the starting point on the communication path, and
when an abnormality in a communication with the downstream communication apparatus is detected or when abnormality information received together with an effectiveness notification through the downstream trunk line communication unit represents that an abnormality is detected, the transmission unit transmits a response to the master candidate notification to the upstream communication apparatus through the upstream trunk line communication unit in order that the upstream communication apparatus becomes a termination point on the communication path.

5. The communication system according to claim 4, wherein when communication is normally performed with no abnormality detected in any of the plurality of communication apparatuses, communication between the communication apparatuses serving as a starting point on the communication path and another communication apparatus is stopped.

6. The communication system according to claim 4, wherein each of the plurality of communication apparatuses are directly connected to separate external electronic control units that exchange data with each other.

7. A communication method for a communication system comprising a plurality of communication apparatuses having communication units for transmitting and receiving data connected in a ring topology or in a daisy-chain topology through a communication line so that data is transmitted and received between the plurality of communication apparatuses with one of the plurality of communication apparatuses serving as a starting point of a communication path and one of the plurality of communication apparatuses serving as a termination point of the communication path, the plurality of communication apparatuses each transmit an effectiveness notification representing that communication is effective to a second communication apparatus by the communication unit, receive the effectiveness notification from the second communication apparatus, and detect an abnormality in a communication with the second communication apparatus based on whether the effectiveness notification is received from the second communication apparatus or not, the communication method comprising steps of:

the communication apparatuses each transmitting abnormality information representing that the abnormality is detected and information representative of an abnormality condition of the communication to the second communication apparatus together with the effectiveness notification, when the abnormality in the communication with the second communication apparatus is detected;

the communication apparatuses each stopping part or all of the communication with the second communication apparatus, when the abnormality in the communication with the second communication apparatus is detected by not having received the effectiveness notification from the second communication apparatus or by having received the abnormality information from the second communication apparatus; and the communication apparatuses each transmitting information for changing a communication path with a third communication apparatus, when the abnormality in the communication with the second communication apparatus is detected;

changing the communication path such that when an abnormality in a communication with an upstream communication apparatus is detected or when abnormality information received together with an effectiveness notification through an upstream trunk line communication unit represents that an abnormality is detected, the transmission unit transmits a master candidate notification to a downstream communication apparatus through a downstream trunk line communication unit in order that the downstream communication apparatus becomes the starting point on the communication path, and changing the communication path such that when an abnormality in a communication with the downstream communication apparatus is detected or when abnormality information received together with an effectiveness notification through the downstream trunk line communication unit represents that an abnormality is detected, the transmission unit transmits a response to the master candidate notification to the upstream communication apparatus through the upstream trunk line communication unit in order that the upstream communication apparatus becomes a termination point on the communication path.

* * * * *